US008909758B2

(12) United States Patent
Bose et al.

(10) Patent No.: US 8,909,758 B2
(45) Date of Patent: Dec. 9, 2014

(54) PHYSICAL SERVER DISCOVERY AND CORRELATION

(75) Inventors: Patrick Glen Bose, San Francisco, CA (US); Ky Tong Vong, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 1265 days.

(21) Appl. No.: 11/460,947

(22) Filed: Jul. 28, 2006

(65) Prior Publication Data

US 2007/0260721 A1    Nov. 8, 2007

Related U.S. Application Data

(60) Provisional application No. 60/746,254, filed on May 2, 2006.

(51) Int. Cl.
*G06F 15/173* (2006.01)
*G06F 15/177* (2006.01)
*G06F 21/00* (2013.01)
*H04L 12/24* (2006.01)
*H04L 29/08* (2006.01)

(52) U.S. Cl.
CPC .......... *H04L 41/0856* (2013.01); *H04L 41/082* (2013.01); *H04L 41/0806* (2013.01); *H04L 41/0886* (2013.01); *H04L 41/0213* (2013.01); *H04L 67/1097* (2013.01); *H04L 41/12* (2013.01)
USPC ................................ 709/224; 709/222; 711/6

(58) Field of Classification Search
CPC ............ G06F 9/45533; G06F 11/0712; H04L 41/0213; H04L 41/06
USPC ....................... 709/224, 222; 711/6
See application file for complete search history.

(56) References Cited

U.S. PATENT DOCUMENTS

| 5,671,357 | A | * | 9/1997 | Humblet et al. .............. 709/242 |
| 6,308,315 | B1 | | 10/2001 | Dice et al. |
| 6,370,656 | B1 | * | 4/2002 | Olarig et al. .................... 714/23 |
| 6,421,711 | B1 | | 7/2002 | Blumenau et al. |
| 6,631,395 | B1 | | 10/2003 | Chessell |
| 6,701,449 | B1 | | 3/2004 | Davis et al. |

(Continued)

OTHER PUBLICATIONS

U.S. Appl. No. 11/460,949, Advisory Action mailed Jun. 18, 2009.

(Continued)

*Primary Examiner* — Ninos Donabed
*Assistant Examiner* — Thomas Richardson
(74) *Attorney, Agent, or Firm* — Meunier Carlin & Curfman, LLC

(57) ABSTRACT

A virtual server system and a method of provisioning a plurality of virtual servers is described. The system may comprise a plurality of physical servers, at least one switch connected to the plurality of physical servers, and a virtual frame director to direct provisioning of a plurality of virtual servers on the physical servers. The virtual frame director may be configured to monitor an event related to a link between each physical server and the switch and, in response to the event, update a virtual server database. The system may comprise a Storage Area Network (SAN) and the virtual frame director may be arranged to configure the network fabric to allow the plurality of physical servers to access to the SAN. For example, the network fabric may be configured to access storage on the SAN from which each physical server is to boot.

19 Claims, 7 Drawing Sheets

(56) References Cited

U.S. PATENT DOCUMENTS

| | | | |
|---|---|---|---|
| 6,801,949 B1 | 10/2004 | Bruck et al. | |
| 7,055,056 B2 | 5/2006 | Bessire | |
| 7,069,296 B2 | 6/2006 | Moller et al. | |
| 7,076,801 B2 | 7/2006 | Gong et al. | |
| 7,111,300 B1 | 9/2006 | Salas et al. | |
| 7,127,633 B1 | 10/2006 | Olson et al. | |
| 7,190,667 B2* | 3/2007 | Susnow et al. | 370/229 |
| 7,213,065 B2 | 5/2007 | Watt | |
| 7,240,234 B2 | 7/2007 | Morita et al. | |
| 7,299,290 B2 | 11/2007 | Karpoff | |
| 7,356,679 B1 | 4/2008 | Le et al. | |
| 7,366,742 B1 | 4/2008 | Umbehocker et al. | |
| 7,379,990 B2* | 5/2008 | Tsao | 709/223 |
| 7,428,584 B2* | 9/2008 | Yamamoto et al. | 709/223 |
| 7,469,289 B2* | 12/2008 | Arakawa et al. | 709/224 |
| 7,546,354 B1 | 6/2009 | Fan et al. | |
| 7,561,593 B1* | 7/2009 | Wilkie | 370/450 |
| 7,706,303 B2 | 4/2010 | Bose et al. | |
| 7,747,816 B1 | 6/2010 | Nourmohamadian et al. | |
| 8,176,153 B2 | 5/2012 | Bose | |
| 8,266,472 B2 | 9/2012 | Bose | |
| 2002/0001307 A1 | 1/2002 | Nguyen et al. | |
| 2002/0069324 A1 | 6/2002 | Gerasimov et al. | |
| 2002/0165961 A1 | 11/2002 | Everdell et al. | |
| 2002/0188711 A1 | 12/2002 | Meyer et al. | |
| 2002/0188870 A1 | 12/2002 | Gong et al. | |
| 2003/0005028 A1 | 1/2003 | Dritschler et al. | |
| 2003/0005125 A1 | 1/2003 | Berthaud et al. | |
| 2003/0018927 A1 | 1/2003 | Gadir et al. | |
| 2003/0078996 A1 | 4/2003 | Baldwin | |
| 2003/0103455 A1* | 6/2003 | Pinto | 370/230 |
| 2003/0131246 A1* | 7/2003 | Reeves et al. | 713/182 |
| 2003/0217131 A1 | 11/2003 | Hodge et al. | |
| 2004/0054725 A1 | 3/2004 | Moller et al. | |
| 2004/0236633 A1 | 11/2004 | Knauerhase et al. | |
| 2005/0028028 A1 | 2/2005 | Jibbe | |
| 2005/0120160 A1 | 6/2005 | Plouffe et al. | |
| 2005/0262505 A1 | 11/2005 | Esfahany et al. | |
| 2006/0075055 A1* | 4/2006 | Littlefield | 709/206 |
| 2006/0107087 A1 | 5/2006 | Sieroka et al. | |
| 2006/0114917 A1 | 6/2006 | Raisch | |
| 2006/0129877 A1* | 6/2006 | Yamamoto et al. | 714/6 |
| 2006/0143617 A1 | 6/2006 | Knauerhase et al. | |
| 2006/0294516 A1 | 12/2006 | Winner et al. | |
| 2007/0027973 A1* | 2/2007 | Stein et al. | 709/223 |
| 2007/0067435 A1 | 3/2007 | Landis et al. | |
| 2007/0234334 A1 | 10/2007 | Araujo, Jr. et al. | |
| 2007/0234337 A1 | 10/2007 | Suzuki et al. | |
| 2007/0250608 A1 | 10/2007 | Watt | |
| 2007/0258388 A1 | 11/2007 | Bose | |
| 2007/0283015 A1 | 12/2007 | Jackson et al. | |
| 2007/0294563 A1 | 12/2007 | Bose | |
| 2007/0297428 A1 | 12/2007 | Bose et al. | |
| 2007/0299906 A1 | 12/2007 | Bose et al. | |
| 2009/0282404 A1 | 11/2009 | Khandekar et al. | |
| 2010/0228840 A1 | 9/2010 | Bose et al. | |

OTHER PUBLICATIONS

U.S. Appl. No. 11/460,949, Decision on Pre-Appeal Brief Request mailed Sep. 25, 2009, 3 pgs.
U.S. Appl. No. 11/460,949, Final Office Action mailed Mar. 30, 2009, 8 pgs.
U.S. Appl. No. 11/460,949, Final Office Action mailed Jul. 9, 2010, 11 pgs.
U.S. Appl. No. 11/460,949, Final Office Action mailed Sep. 28, 2011, 5 pgs.
U.S. Appl. No. 11/460,949, Non Final Office Action mailed Apr. 14, 2011, 11 pgs.
U.S. Appl. No. 11/460,949, Non Final Office Action mailed Nov. 19, 2010, 5 pgs.
U.S. Appl. No. 11/460,949, Non-Final Office Action mailed Jan. 8, 2010, 9 pgs.
U.S. Appl. No. 11/460,949, Non-Final Office Action mailed Sep. 30, 2008, 08 pgs.
U.S. Appl. No. 11/460,949, Notice of Allowance mailed May 11, 2012, 8 pgs.
U.S. Appl. No. 11/460,949, Pre-Appeal Brief Request filed Jun. 30, 2009, 5 pgs.
U.S. Appl. No. 11/460,949, Response filed Feb. 1, 2011 to Non Final Office Action mailed Nov. 19, 2010, 9 pgs.
U.S. Appl. No. 11/460,949, Response filed Mar. 16, 2012 to Final Office Action mailed Sep. 28, 2011, 10 pgs.
U.S. Appl. No. 11/460,949, Response filed Apr. 7, 2010 to Non Final Office Action mailed Jan. 8, 2010, 8 pgs.
U.S. Appl. No. 11/460,949, Response filed May 29, 2009 to Final Office Action mailed Mar. 30, 2009, 9 pgs.
U.S. Appl. No. 11/460,949, Response filed Aug. 15, 2011 to Non Final Office Action mailed Apr. 14, 2011, 11 pgs.
U.S. Appl. No. 11/460,949, Response filed Sep. 23, 2010 to Final Office Action mailed Jul. 9, 2010, 11 pgs.
U.S. Appl. No. 11/460,949, Response filed Dec. 30, 2008 to Non Final Office Action mailed Sep. 30, 2008, 9 pgs.
U.S. Appl. No. 11/692,736, Examiner interview Summary mailed Jan. 30, 2012, 3 pgs.
U.S. Appl. No. 11/692,736, Final Office Action mailed Mar. 28, 2011, 22 pgs.
U.S. Appl. No. 11/692,736, Non Final Office Action mailed Aug. 4, 2010, 20 pgs.
U.S. Appl. No. 11/692,736, Non Final Office Action mailed Oct. 12, 2011, 22 pgs.
U.S. Appl. No. 11/692,736, Response filed Jan. 4, 2011 to Non Final Office Action mailed Aug. 4, 2010, 10 pgs.
U.S. Appl. No. 11/692,736, Response filed Aug. 10, 2011 to Final Office Action mailed Mar. 28, 2011, 10 pgs.
U.S. Appl. No. 11/734,610, Non Final Office Action mailed Jul. 23, 2009, 17 pgs.
U.S. Appl. No. 11/734,610, Notice of Allowance mailed Dec. 17, 2009, 4 pgs.
U.S. Appl. No. 11/734,610, Response filed Nov. 16, 2009 to Non Final Office Action mailed Jul. 23, 2009, 13 pgs.
U.S. Appl. No. 11/743,537, Final Office Action mailed Feb. 9, 2011, 16 pgs.
U.S. Appl. No. 11/743,537, Non Final Office Action mailed Mar. 23, 2010, 13 pgs.
U.S. Appl. No. 11/743,537, Non Final Office Action mailed Aug. 12, 2011, 13 pgs.
U.S. Appl. No. 11/743,537, Non Final Office Action mailed Sep. 3, 2010, 18 pgs.
U.S. Appl. No. 11/743,537, Notice of Allowance mailed Jan. 3, 2012, 13 pgs.
U.S. Appl. No. 11/743,537, Preliminary Amendment filed Jun. 17, 2008, 7 pgs.
U.S. Appl. No. 11/743,537, Response filed May 9, 2011 to Final Office Action mailed Feb. 9, 2011, 12 pgs.
U.S. Appl. No. 11/743,537, Response filed Jun. 23, 2010 to Non Final Office Action mailed Mar. 23, 2010, 13 pgs.
U.S. Appl. No. 11/743,537, Response filed Nov. 14, 2011 to Non Final Office Action mailed Aug. 12, 2011, 8 pgs.
U.S. Appl. No. 11/743,537, Response filed Dec. 3, 2010 to Non Final Office Action mailed Sep. 3, 2010, 12 pgs.
U.S. Appl. No. 12/754,489, Preliminary Amendment filed May 25, 2010, 7 pgs.
McMillan Jr., et al., "Fault Tolerant, High Availability Network Appliance", Incorporated by reference U.S. Appl. No. 09/552,781, (2000).
U.S. Appl. No. 11/743,537, Examiner Interview Summary mailed Mar. 28, 2011, 3 pgs.

* cited by examiner

PHYSICAL SERVER DISCOVERY AND CORRELATION

RELATED APPLICATIONS

This patent application claims the benefit of priority, under 35 U.S.C. Section 119(e), to U.S. Provisional Patent Application Ser. No. 60/746,254, filed on May 2, 2006, the entire content of which is incorporated herein by reference.

FIELD

The present invention relates generally to the field of virtual servers.

BACKGROUND

Virtual servers may be used to make more efficient use of physical servers. Physical servers may be added into a virtual frame data repository in order to be managed by a virtual frame management system. The physical servers have many attributes, and in a large environment, it becomes tedious and error-prone to enter these details manually. Additionally, once assets are added, it is important to be able to locate the equipment as well as correlate the added equipment with interconnected equipment to enable the assessment of changes to equipment. For example, if a system administrator knows that server A is connected to switch B then the system administrator can determine that bringing switch B down for maintenance will have an effect on service provided by server A.

Some existing systems, such as Cisco Discovery Protocol (CDP) either provide information or the ability to derive information about which switch port a physical server interface is connected to. Some existing switches provide information on what MAC addresses are visible from a switch port. Also, it is common for some switches to provide SNMP traps on linkUp and linkDown events.

However, not all switches provide this information. Furthermore, conventional systems fail to correlate virtual servers with physical servers and their corresponding physical connections.

BRIEF DESCRIPTION OF THE DRAWINGS

The invention is illustrated by way of example, and not limitation, in the figures of the accompanying drawings, in which like reference numerals indicate the same or similar features unless otherwise indicated.

In the drawings.

DETAILED DESCRIPTION

A method and a system for physical server discovery and correlation in a virtual server environment are described. It will be evident, however, to one skilled in the art that the present application may be practiced without these specific details.

Figure 1:
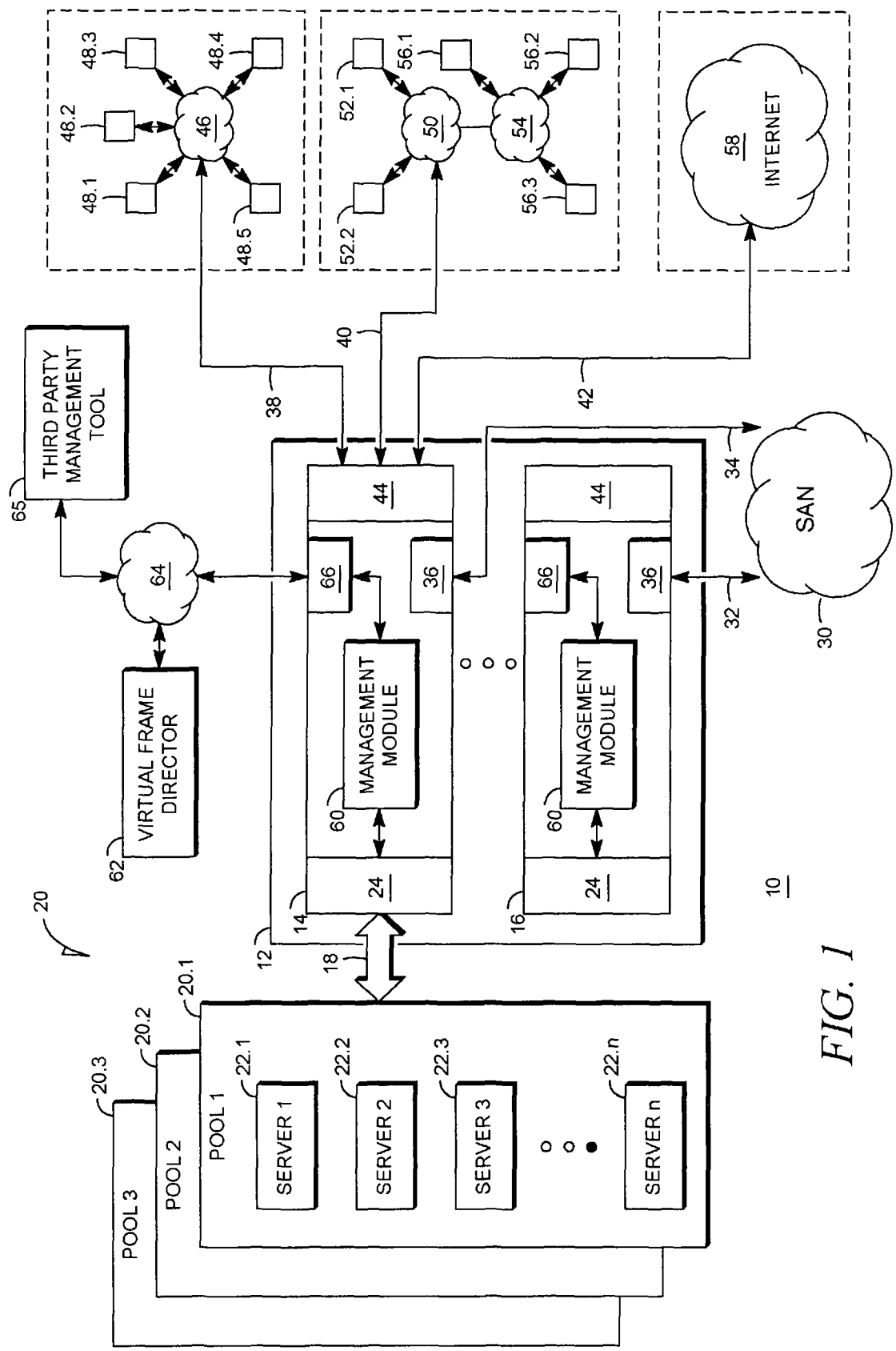
FIG. 1 shows example architecture of a virtual server system in accordance with an example embodiment.

Referring to FIG. 1, reference 10 generally indicates a virtual server system (herein referred to by way of example as "VFrame") with associated hardware on which the virtual servers are deployed. The virtual server system 10 allows server personalities to be assigned to generic static servers over a server fabric switch. In an example embodiment, as the server personality is separated from the physical structure, it may be possible to provision virtual servers on-demand out of industry standard components. Each virtual server deployed on a physical server defines a state or personality of a physical server. This may include the logical definitions and configuration information stored in and used by a virtual frame director (described by way of example in more detail below) to program a server fabric as well as an OS and applications of the virtual server. The state or personality may be stored on a logical unit on a Storage Area Network, as described in more detail below. Thus, in FIG. 1, the example physical servers 22.1-22.$n$ are the physical devices on which one or more virtual servers run. These physical servers include the CPU, memory, IO devices, and the like.

The system 10 is shown, by way of example, to include a switch group 12 including one or more switches 14, 16. The switch group 12 is connected, for example, via an InfiniBand link 18 to one or more server pools 20. By way of example, three physical server pools 20.1-20.3 (on which the virtual servers are deployed) are shown in FIG. 1 but it will be appreciated that any number of server pools may be provided and that each server pool may have a different number of server blades, racks, or the like. Each server pool 20.1-20.3 is shown to include a plurality of physical servers 22.1-22.$n$ linked via one or more InfiniBand links 18 to the switch group 12. Accordingly, when the link 18 is an InfiniBand link, each switch 14 may include an InfiniBand interface 24 to interface the server pools 20.1-20.3 to the switch group 12. The InfiniBand architecture or link may define a high speed network for interconnecting processing nodes and I/O nodes. In an InfiniBand network, processing nodes and I/O nodes are connected to the fabric by Host Channel Adapters (HCAs) and Target Channel Adapters (TCAs). It will however be appreciated that, in addition to instead of, the InfiniBand link 18 other links may be provided.

Figure 2:
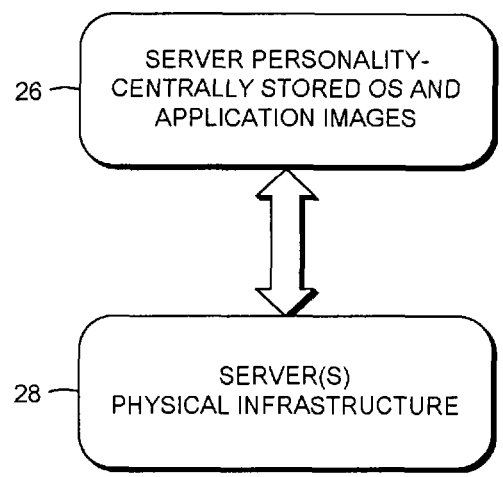
FIG. 2 shows separation of the physical infrastructure from the server personality of a server of the system of FIG. 1.

FIG. 2 shows that the personality of virtual servers running on each physical server 22.1-22.$n$ is separated from the physical servers or infrastructure (see blocks 26 and 28 in FIG. 2). For example, the personality of the physical servers 22.1-22.$n$ (e.g., the operating system (OS), application image(s), or the like) may be stored remotely from the physical server infrastructure on a Storage Area Network (SAN) 30. In this example, the physical server infrastructure can be stateless computational resources with CPUs and memory. For example, as shown in FIG. 1, the SAN 30 (including one or more databases) may be provided to operate in conjunction with the physical servers 22.1-22.n. It will be appreciated that the SAN 30 may be a distributed data facility dispersed geographically. In an example embodiment, the SAN 30 is connected to the example switches 14, 16 via fibre channel connections 32, 34. Accordingly, each switch 14, 16 may include a fibre channel gateway 36. It will however be appreciated that in other embodiments, the switches 14, 16 may communicate with the SAN 30 via other channels in addition to, or instead of, the fibre channel gateway. The personalities or state of the physical servers to define the virtual servers may be stored in a local database or on the SAN 30.

The switch 14 is shown to communicate with plurality of different networks (Local Area Networks, Wide Area Networks, or the like) via communication links 38, 40, 42. For example, the communication links 38, 40, 42 may be Ethernet connections and, accordingly, each switch 14, 16 may include one or more Ethernet gateway modules 44. In the example system 10, the communication link 38 is shown to connect to a network 46 interconnecting a plurality of hosts 48.1-48.5. The hosts 48.1-48.5 may form part of another data network, or be any other network host.

The switch 14 is also shown to communicate via the communication link 40 to a network 50 which may, for example, be an enterprise network. The network 50 is shown to communicate with desktop computers 52.1-52.2 and a subnet 54 which, in turn, is connected to desktop computers 56.1-56.3. Further, the switch 14 is also shown to connect via the communication link 42 to a network such as the Internet 58. It will however be appreciated that the aforementioned networks are merely example networks and different configurations and different numbers of networks and subnets may be provided that connect a wide range of network devices.

The system 10 may allow virtualization of servers deployed on the physical servers 22.1-22.n that may be managed by a management module 60, which is shown, by way of example, to reside at the switch 14. It will, however, be appreciated that the management module 60 may reside in other components. The management module 60 communicates with a virtual frame director 62 that controls the provisioning of the server pools 20.1-20.3. In an example embodiment, the virtual frame director 62 communicates via a network 64 with the management module 60. The system 10 also includes a third party management tool 65 that communicates with the virtual frame director 62 and/or with the management module 60 to manage the provisioning of virtual servers. In an example embodiment, the network 64 is an Ethernet network and, accordingly, the switch 14 may thus include one or more Ethernet ports 66. It will however be appreciated that the various communication links linking the various components/devices in the system 10 are not restricted to InfiniBand connections, Ethernet connections, or the like. Any communication means may be provided to interconnect the various components.

Figure 3:
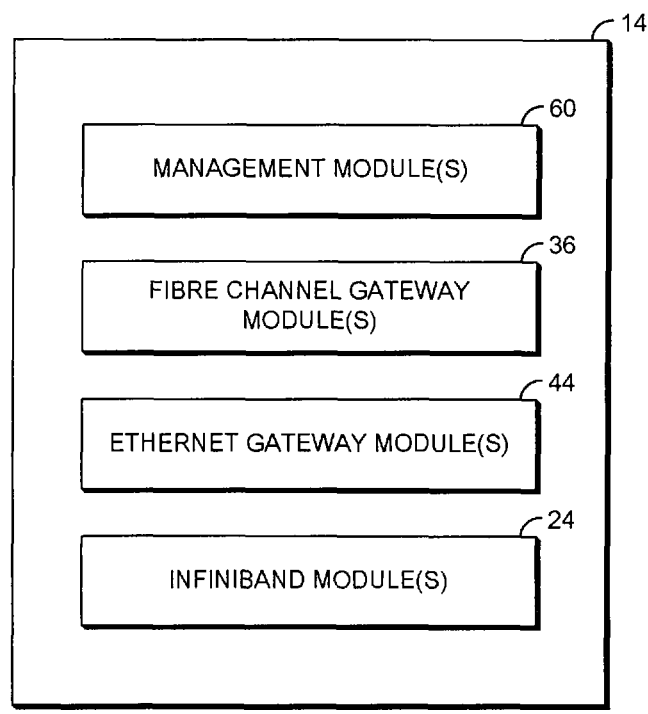
FIG. 3 shows a switch, in accordance with an example embodiment, deployed in the system.

Referring to FIG. 3, example modules of the switch 14 are shown. For example, the switch 14 is shown to include one or more management modules 60, one or more fibre channel gateway modules 36, one or more Ethernet gateway modules 44, and one or more InfiniBand modules 24. It will be appreciated that the modules 60, 36, 44, and 24 may include various electronic components to effect communication using the relevant protocols. In an example embodiment, the virtual frame director 62 of the system 10 allows software partners to program the switches 14, 16 with policies necessary to implement virtual servers on demand. For example, the third party management tool 65 may be used to accomplish this.

Figure 4:
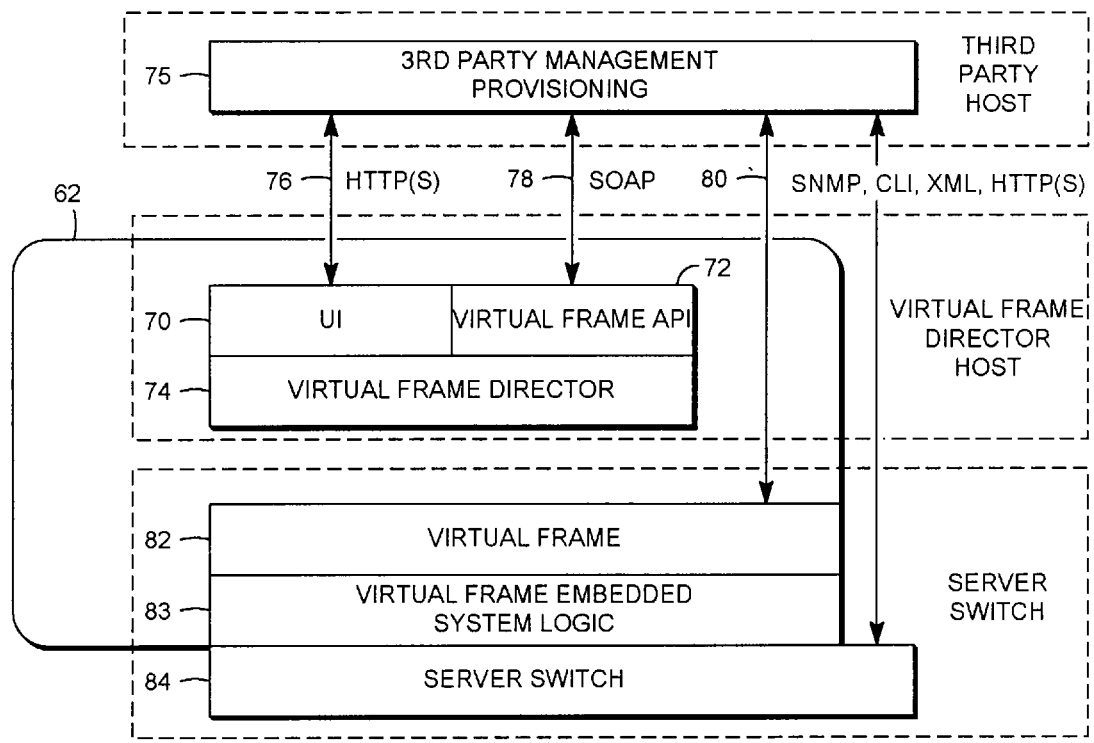
FIG. 4 shows example software architecture of a management module communicating with a third party management tool.

As shown by way of example in FIG. 4, logically the virtual frame director 62 (which may reside on a separate server) may include a user interface module 70, a virtual frame director Application Program Interface (API) 72 and a virtual frame (VFrame) director platform 74. The virtual frame director 62 may communicate with a third party management tool application 75 (see also third party management tool 65 in FIG. 1) via, for example, the network 64. In an example embodiment, the user interface module 70 communicates with the third party management and provisioning module 75 via an HTTP(s) link 76, a SOAP link 78, or the like. The third party management and provisioning module 75 is also shown to communicate via a link 80 to a virtual frame platform 82. The server switch 14 is also shown to include embedded system logic 83 provided at a switch 84 (e.g., a switch 14, 16).

Figure 5:
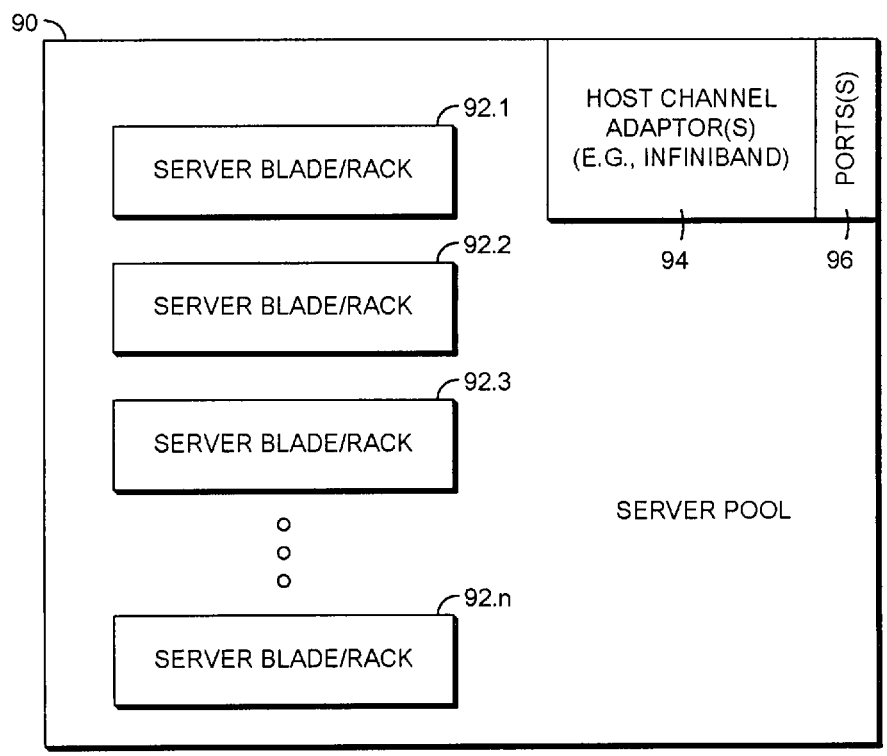
FIG. 5 shows a physical server pool, in accordance with an example embodiment, of the system of FIG. 1.

Referring to FIG. 5, reference 90 generally indicates an example server pool (e.g., see pools 20.1-20.3 in FIG. 1). The server pool 90 is shown to include a plurality of physical servers or server blades 92.1-92.n which each host one or more virtual servers. The servers 92.1-92.n may correspond to the servers 22.1-22.n in FIG. 1. In an example embodiment, in order to communicate via the communication link 18, each server pool 90 includes one or more host channel adapters (HCA) 94 (e.g., one or two HCAs per physical server) when deployed in an InfiniBand environment. Further, one or more ports 96 may be provided for communication via further communication protocols or channels. As mentioned above, the servers 92.1-92.n are physical servers. In will be appreciated that the virtual servers hosted on the physical servers may be defined by a network configuration/logical definitions stored in a database of the virtual frame director 62 and a state which is stored on networked storage (e.g., the SAN 30).

Figure 6:
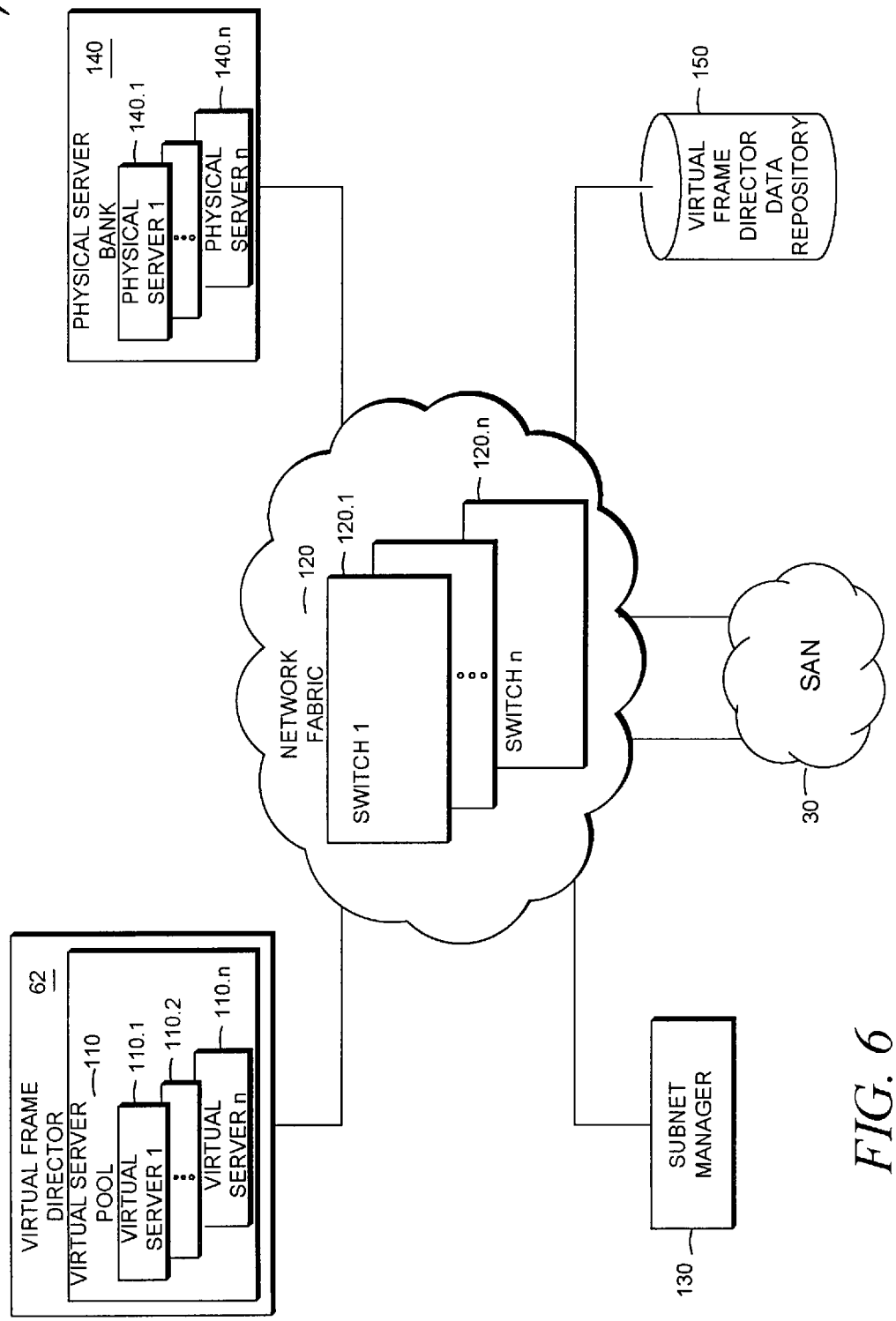
FIG. 6 shows a system, in accordance with an example embodiment, of physical server discovery and correlation.

FIG. 6 shows a system 100, in accordance with an example embodiment, for physical server discovery and correlation. A method 160 (see FIG. 7), in accordance with an example embodiment, for physical server discovery may be deployed on the system 100 and, accordingly, the method 160 is described by way of example with reference thereto.

The system 100 is shown to include a number of physical servers 140.1140.n in a physical server bank 140 (which may correspond to any one of the server pools 20.1-20.3 in FIG. 1) which are associated with corresponding virtual servers 110.1-110.n in a virtual server pool or group 110. In an example embodiment, the virtual servers 110.1-110.n are managed by a virtual frame (or server) director (VFD) 62 (see also the virtual frame director 62 in FIG. 1). The virtual frame director 62 is connected to the physical server bank 140 through a network shown to include a network fabric 120. In an example embodiment, the network fabric 120 is an InfiniBand fabric, and includes switches 120.1-120.n (see for example switches 14 and 16 in FIG. 1). Although example embodiments are described with reference to InfiniBand architecture, it is to be noted that the methods, systems and devices described herein are not restricted to an InfiniBand environment.

An InfiniBand subnet manager 130 is connected to the network fabric 120 to manage nodes in the network fabric 120 including configuring switch ports and identifying their associated connections (e.g., physical addresses of HCAs). Thus, in an example embodiment, the subnet manager 130 runs a software management module for communicating with the one or more switches 120.1-120.n and the one or more servers 140.1-140.n. Management module(s) (e.g., see FIG. 3, reference 60) on each switch 120.1-120.n may have management software running on it which is capable of sending out Simple Network Management Protocol (SNMP) traps or notifications to registered receivers. As part of the initial setup, the virtual frame director 62 registers with the switch management module 60 to receive SNMP traps from each switch 120.1-120.*n* that the subnet manager 130 is managing.

In an example embodiment, as described in more detail below, the virtual frame director 62 directs provisioning of the plurality of virtual servers 110.1-110.*n* on the physical servers 140.1-140.*n* and is configured to monitor an event related to a link between the physical servers 140.1-140.*n* and the switches 120.1-120.*n* and, in response to the event, update a virtual server database (e.g., virtual frame director repository or database 150). Monitoring or enforcing policies of one or more of the virtual servers 110.1-110.*n* may, for example, be in response to a linkUp event and/or linkDown event.

Figure 7:
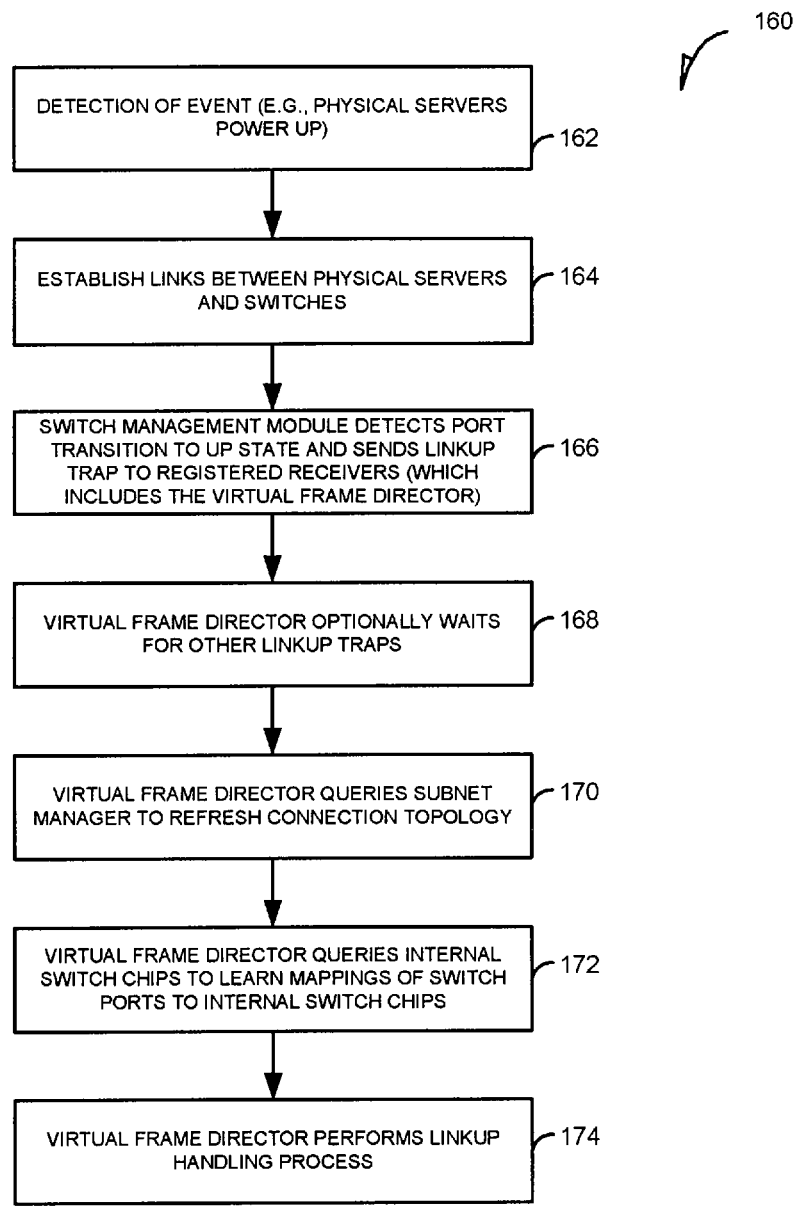
FIG. 7 shows a method, in accordance with an example embodiment, for physical server discovery in a virtual server environment.

When the event related to one or more links occur (e.g., the physical server 140.1, in the physical server bank 140 powers on) links between the InfiniBand host channel adapter (HCA) of that physical server 140.1 and the switch or switches (e.g., the switch 120.1, in network fabric 120 to which the physical server 140.1 is connected) are established (see block 162 in FIG. 7). These links can be brought up by the drivers in HCA firmware or drivers that are installed with a host operating system of the physical server 140.1.

In the given example, the switch management module for the switch 120.1 that is part of the example link may detect that the link state for one of its switch ports has transitioned to the up state, and may send a linkUp trap to the registered receivers which includes the virtual frame director 62 (see block 166 in FIG. 7). The virtual frame director 62 may then receive the linkUp trap and enter a waiting state. During this state, the virtual frame director 62 can wait for additional linkUp traps from other switches (e.g., switches 140.2-140.*n*) that might come in. For example, servers are often dual connected, or multiple servers may be powered on at the same time. As shown at block 168, the method 160 may wait for additional traps so as only to perform the next step once for all the traps or a group of traps (instead of once for each individual trap). A waiting period for additional linkUp traps may also decrease the chance that the virtual frame director 62 would miss being able to process other events (e.g., short lived linkUp events where the server would come up and down before virtual frame director could complete the rest of the process).

When the waiting period ends, the virtual frame director 62 may query the subnet manager 130 to refresh the virtual frame director's view of the connection topology (e.g., the InfiniBand topology) as shown at block 170. The virtual frame director 62 may also query each switch 120.1-120.*n* to learn the mappings of switch ports to internal switch chips of the switches 120.1-120.*n*. When the refresh is finished, the virtual frame director 62 may perform a linkUp event handling process for each trap that was received (see block 174). Thus, upon occurrence of an event the virtual frame director 62 may automatically, without human intervention, detect changes in network topology. This is in contrast to systems that periodically discover a status of the network topology where an event may take place (e.g., a physical server may go up and down) during the period between the periodic discovery instances. In contrast, the method 160 may thus dynamically respond to network events and provide a real-time "snapshot" of virtual server-related configuration data.

The handling process in block 174 may be dependent upon whether the event is a linkup event or a linkDown event. The handling process may include provisioning new virtual server, executing (or at least initiating) a monitoring policy, or perform any other system related operations, diagnostics, or the like.

Figure 8:
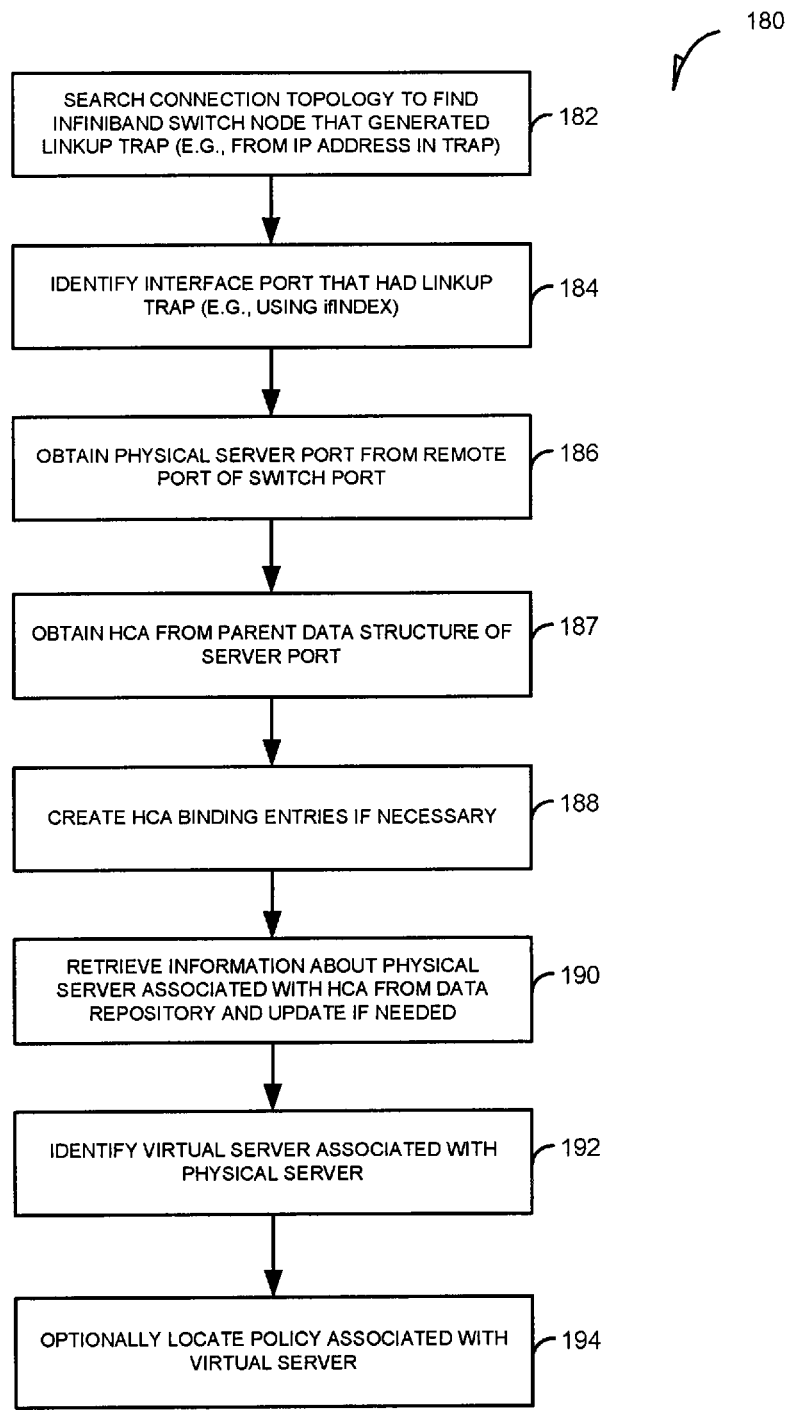
FIG. 8 shows a method, in accordance with an example embodiment, for physical server correlation in a virtual server environment.

Referring to FIG. 8, a method 180, in accordance with an example embodiment, to correlate physical and virtual servers is shown. As shown at block 182, a handling process (see block 174 in FIG. 7) may search the connection topology to find the InfiniBand switch (e.g., switch 120.1 in the above example) that generated a trap. The trap may contain the IP address of the switch (e.g., switch 120.1), and this IP address may then be used to identify the switch in the connection topology (e.g., the network fabric 120 in the example embodiment shown in FIG. 6). In an example embodiment, the trap may also contain an ifIndex. The ifIndex is a unique number (greater than zero) that identifies each switch interface to allow SNMP identification of that interface. Thus, as shown at block 184, the ifIndex identifies the interface for the port that had the linkUp event in the given example. However, it is to be noted that although an example embodiment is described with reference to a linkUp event, the methods 160 and 180 also apply to a linkDown event. Thus, the ifIndex may be used to identify the switch port on a given switch 120.1-120.*n* associated with the event. Thereafter, as shown at block 186, a remote port of the switch interface identified in block 184 may be identified from the connection topology. The remote port of a switch port may be a physical server port. The physical server port may be contained by its parent node data structure, which may in the InfiniBand environment be an HCA interface, as shown at block 187.

The parent node data structure may also contain a global unique identifier (GUID) of the node, which is the GUID of the HCA (e.g., see HCA 94 in FIG. 5) in the corresponding physical server (e.g., physical server 140.1) in physical server bank 140. The virtual frame director repository 150 may then be searched to determine if an HCA with this GUID is already known. If an HCA with this GUID is not found, then new physical server, HCA, and HCA binding entries are created in the repository 150 (see block 188).

Thereafter, as shown at block 190, information about the physical server (e.g., physical server 140.1) associated with this HCA is retrieved from the virtual frame director repository 150. For example, the existing HCA bindings for this HCA may be retrieved from the virtual frame director repository 150. The HCA bindings may be contained in an HCA data structure and include the HCA port number (derived from the server port identified in box 186), switch id (derived from data repository by knowing the IP address of the switch), switch slot, and switch port (the switch slot and port may be derived from the ifIndex). The current set of HCA bindings may be checked to determine if there is an existing binding for the same HCA port. A new HCA binding data structure may be added if one does not exist or the information is used to update the existing one. The virtual frame director repository 150 may then be updated with the new information.

The virtual server (e.g., a virtual server 110.1-110.*n*) associated with the physical server (e.g., a physical server 140.1-140.*n*) is then identified (see block 192) using the information in the virtual frame director repository 150. If a physical server 140.1-140.*n* is not assigned to a virtual server, then an associated virtual server may not be found. A message may then be logged recording the linkUp event (and optionally associated details) and describing details of the physical server, the virtual server (if assigned), the switch, a switch slot, and a switch port. At this point, additional handling processes can be performed based on the identified information (see block 194). For example, by identifying the virtual server (e.g., 110.1) assigned to a physical server (e.g., 140.1) that is associated with a linkUp event, a system administrator, or the system itself (automatically), could locate a policy associated with the virtual server that is affected by the linkUp event.

It will thus be noted that methods 160 and 180 dynamically monitor and/or detect changes in network topology (e.g., changes in associations between virtual servers and physical servers, changes in physical connections between physical server and switches/switch ports) so that any at given time comprehensive information on the virtual server system 100 is available (e.g., in the virtual frame director repository 150).

As mentioned above, the methods 160 and 180 are not restricted to events such as linkUp event but also relate link-Down events. On linkDown events, the process may be substantially similar (or even the same) to update the network topology information in the virtual frame director data repository. However, in an example embodiment, the link event handling functionality may differ when it is determined to be a linkDown event. The same correlation methods (e.g., the method 180) may be used to find out what virtual server was affected by the linkDown event. If a virtual server (e.g., virtual server 110.1) is determined to be assigned to the physical server (e.g., physical server 140.1) that had a linkDown event, the virtual frame director 62 may send a signal to a policy system/module to check that server. This signal may cause the policy system to prioritize checking that server (e.g., physical server 140.1) instead of waiting in a normal schedule to perform checks. For example, the policy/monitoring system could try to ping the host to determine if it was still reachable on an alternate physical link. In this manner, it may be possible to detect certain failures in a virtual server system earlier in a dynamic manner rather than responding to periodic checking routines. Thus events relating to a connection between a physical server and a switch may automatically trigger virtual server related actions and procedures.

An example of a data structure for the HCA (e.g., in the virtual frame director repository 150) is:
id—database identifier (internal use)
GUID—HCA GUID, unique physical identifier of the HCA
serverId—database identifier of the physical server associated with this HCA (e.g., reference may be to a server table)
Connection bindings—list of the HCA bindings for this HCA
An example of a node data structure for the HCA binding is:
HCA—database identifier of the HCA that binding refers to
HCAPort—port number of the HCA this binding is for
switchId—database identifier of switch that HCA port is connected to
slotNum—slot id of module on switch that port is connected to
portNum—port number on slot this port is connected to
id—internal database identifier Thus, the physical servers 140.1-140.n may each have a database identifier (id). Using this identifier, the method 180 can find the HCAs in the physical server 140.1-140.n. Using the HCA id, the method 180 can find the bindings for the HCA.

The methods, systems and devices described herein may combine data from traps, a subnet manager, a switch configuration, and a virtual frame director configuration to provide information about virtual servers (e.g., the virtual server 110.110.n) in addition to physical servers (e.g., the physical server 140.1-140.n). The example methods and system described herein may also tie in to a data repository and policy engine for automated actions (e.g., adding servers, updating bindings, reprioritizing policies).

With the example methods, system and devices described herein, new physical servers can be added to the virtual server environment by plugging them into the network and turning the power on. The methods, system and devices may make it faster to detect failures on virtual servers. For example, removing a blade from a blade server would trigger a link-Down event. This would reprioritize the policy for that server and, using the methods described herein, the failure would be detected faster than waiting to poll that server. The methods, system and devices also facilitate adding additional handlers to do virtual server specific processing for events.

The methods, system and devices may provide the ability for administrators to track down equipment in a virtual server system. In an example embodiment, the bindings may be displayed with the physical server in a user interface (UI). Using data in the virtual frame director repository 150, a system administrator can then locate the appropriate switch, slot, port and follow the cable to the server if needed.

The methods, system and devices may also provide the ability to do impact analysis, such as what servers will be affected if a particular switch is taken down. More advanced functionality may also be performed, such as having a virtual frame director (e.g., a virtual frame director 62) migrate active physical servers to other switches, or facilitate a rolling upgrade (e.g., only update one switch at a time in a set where a server is dual connected). If a switch does fail and the failure is detected, a report may be generated to show the compromised servers and/or migrate them to available servers.

Figure 9:
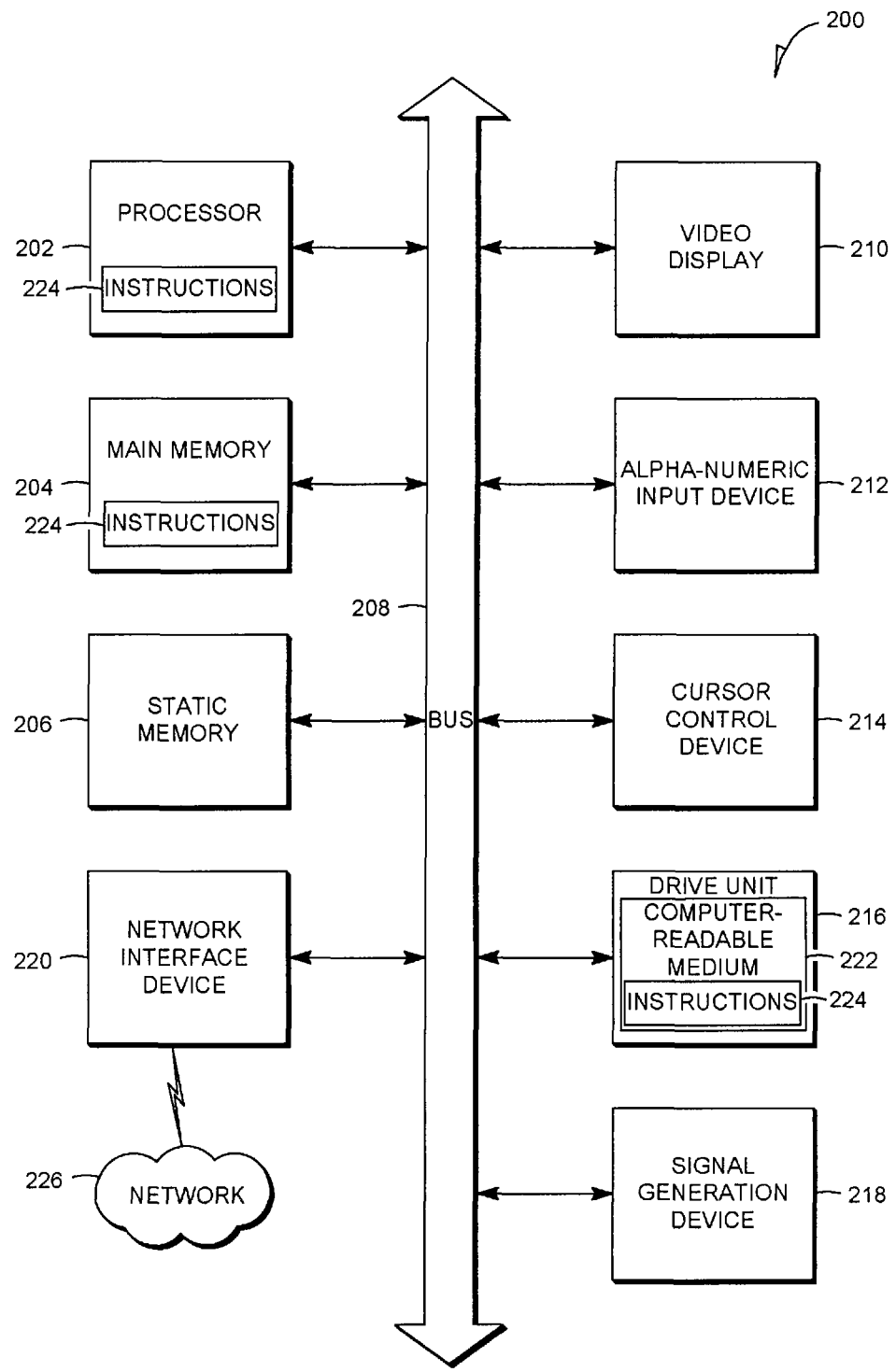
FIG. 9 shows a diagrammatic representation of machine in the exemplary form of the computer system within which a set of instructions, for causing the machine to perform any one of the methodologies discussed herein, may be executed.

FIG. 9 shows a diagrammatic representation of machine in the exemplary form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 200 includes a processor 202 (e.g., a central processing unit (CPU) a graphics processing unit (GPU) or both), a main memory 204 and a static memory 206, which communicate with each other via a bus 208. The computer system 200 may further include a video display unit 210 (e.g., a liquid crystal display (LCD)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media.

The software 224 may further be transmitted or received over a network 226 via the network interface device 220.

While the machine-readable medium 222 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention. The term "machine-readable medium" shall accordingly be taken to include, but not be limited to, solid-state memories, optical media, and magnetic media.

Thus, a method and a system for physical server discovery and correlation in a virtual server environment are described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A virtual server system comprising:
a plurality of physical servers;
a plurality of switches;
a virtual frame director including a policy module, the virtual frame director performing:
direct provisioning of a plurality of virtual servers on the plurality of physical servers, each virtual server concurrently executing a different operating system;
monitoring respective events generated by the plurality of switches and related to a link state between the plurality of physical servers and the plurality of switches and, in response to the events:
contacting, over a network, a subnet manager to refresh a connection topology;
determining from the connection topology a particular one of the plurality of switches that generated an event of the events;
determining a communication port on the particular switch that generated the event based upon an identification received as part of the event;
determining a remote communication port of a particular one of the plurality of physical servers from the connection topology, the determined switch, and the communication port of the switch;
retrieving a record of the remote communication port stored in a virtual server database, the virtual server database storing networking configuration information of the virtual servers;
determining that one of the plurality of virtual servers is provisioned on the particular physical server based upon binding information in the record of the remote communication port and information in the virtual server database;
determining that the event indicates that a link between the particular physical server and the particular switch is down;
responsive to determining that the event indicates that the link is down and that one of the plurality of virtual servers is provisioned on the particular physical server, sending a signal to the policy module to bypass a normal schedule and prioritize checking the particular physical server and ping the particular physical server to determine if the particular physical server is reachable on a different link between the particular physical server and a different switch of the plurality of switches;
determining that another event of the events indicates that a link between the particular physical server and the particular switch of the plurality of switches is up in response to checking the particular server;
waiting to receive an additional event that indicates that the different link between the particular physical server and the different switch of the plurality switches is up; and
in response to receiving the another event and the additional event, refreshing, using the subnet manager, the connection topology, the connection topology indicative of the current state of the plurality of physical servers and the plurality of switches.

2. The virtual server system of claim 1, further comprising a Storage Area Network (SAN) remote from the plurality of physical servers, and wherein the virtual frame director configures network fabric to allow at least one of the plurality of physical servers to access the SAN.

3. The virtual server system of claim 2, wherein the at least one of the plurality of physical servers boots from storage on the remote SAN.

4. The virtual server system of claim 1, in which the virtual frame director updates the virtual server database automatically, without human intervention, to modify a status of the link state in the virtual server database, and wherein the link state is associated with a virtual server of the plurality of virtual servers.

5. The virtual server system of claim 1, in which the virtual frame director updates the virtual server database to modify data associated with at least one virtual server of the plurality of servers.

6. The virtual server system of claim 1, wherein the virtual frame director initiates a fail-over procedure to provision a virtual server of the plurality of virtual servers on another physical server responsive to determining that the event indicates that the link is down and that one of the plurality of virtual servers is provisioned on the particular physical server.

7. The virtual server system of claim 1, wherein the event generated by the switch comprises a Simple Network Management Protocol (SNMP) trap and wherein the virtual frame director registers with the switch to receive SNMP traps.

8. The virtual server system of claim 1, wherein the virtual frame director powers up one of the plurality of physical servers that then establishes links with one of the plurality of switches and update the virtual server database to record the newly established links.

9. The virtual server system of claim 1, wherein the virtual frame director queries the switch to identify port mappings and, in response to a query response, update the connection topology in the virtual server database.

10. The virtual server system of claim 1, wherein the virtual frame director executes a virtual server policy associated with a virtual server of the plurality of virtual servers.

11. The virtual server system of claim 1, wherein the virtual frame director identifies the communication port of the particular switch using an ifIndex.

12. The virtual server system of claim 1, wherein connections between at least one of the plurality of physical servers and at least one of the plurality of switches are InfiniBand connections.

13. A method of managing a plurality of virtual servers provisioned on a plurality of physical servers, each virtual server concurrently executing a different operating system, the method comprising:

monitoring respective events generated by a plurality of switches connected to the plurality of physical servers and related to a link state between the plurality of physical servers and the plurality of switches;

in response to the events:

contacting, over a network, a subnet manager to refresh a connection topology;

determining from the connection topology a particular one of the plurality of switches that generated an event of the events;

determining a communication port on the particular switch that generated the event based upon an identification received as part of the event;

determining a remote communication port of a particular one of the plurality of physical servers from the connection topology, the determined switch, and the communication port of the switch;

retrieving a record of the remote communication port stored in a virtual server database, the virtual server database storing networking configuration information of the virtual servers;

determining that one of the plurality of virtual servers is provisioned on the particular physical server based upon binding information in the record of the remote communication port and information in the virtual server database;

determining that the event indicates that a link between the particular physical server and the particular switch is down;

responsive to determining that the event indicates that the link is down and that one of the plurality of virtual servers is provisioned on the particular physical server, sending a signal to a policy module of a virtual frame director to bypass a normal schedule and prioritize checking the particular physical server and ping the particular physical server to determine if the particular physical server is reachable on a different link between the particular physical server and a different switch of the plurality of switches;

determining that another event of the events indicates that a link between the particular physical server and the particular switch of the plurality of switches is up in response to checking the particular server;

waiting to receive an additional event that indicates that the different link between the particular physical server and the different switch of the plurality switches is up; and in response to receiving the another event and the additional event, refreshing, using the subnet manager, the connection topology, the connection topology indicative of the current state of the plurality of physical servers and the plurality of switches.

14. The method of claim 13, which comprises configuring a network fabric to allow access to a remote Storage Area Network (SAN) in response to the events.

15. The method of claim 13, which comprises automatically, without human intervention, modifying a status of the link state in the virtual server database, wherein the link state is associated with a virtual server of the plurality of virtual servers.

16. The method of claim 13, which comprises updating the virtual server database to modify data associated with at least one virtual server of the plurality of virtual servers.

17. The method of claim 13, which comprises querying the switch to identify port mappings and, in response to a query response, updating the connection topology in the virtual server database.

18. A virtual frame director device to manage a plurality of virtual servers provisioned on a plurality of physical servers, each virtual server concurrently executing a different operating system, the device comprising:

a policy module;

a monitoring module monitoring respective events generated by the plurality of switches and related to a link state between the plurality of physical servers and the plurality of switches; and an update module performing:

responsive to the events:

contacting, over a network, a subnet manager to refresh a connection topology;

determining from the connection topology a particular one of the plurality of switches that generated an event of the events;

determining a communication port on the particular switch that generated the event based upon an identification received as part of the event;

determining a remote communication port of a particular one of the plurality of physical servers from the connection topology, the determined switch, and the communication port of the switch;

retrieving a record of the remote communication port stored in a virtual server database, the virtual server database storing networking configuration information of the virtual servers;

determining that one of the plurality of virtual servers is provisioned on the particular physical server based upon binding information in the record of the remote communication port and information in the virtual server database;

determining that the event indicates that a link between the particular physical server and the particular switch is down;

responsive to determining that the event indicates that the link is down and that one of the plurality of virtual servers is provisioned on the particular physical server, sending a signal to the policy module to bypass a normal schedule and prioritize checking the particular physical server and ping the particular physical server to determine if the particular physical server is reachable on a different link between the particular physical server and a different switch of the plurality of switches;

determining that another event of the events indicates that a link between the particular physical server and the particular switch of the plurality of switches is upon response to checking the particular server;

waiting to receive an additional event that indicates that the different link between the particular physical server and the different switch of the plurality switches is up; and in response to receiving the another event and the additional event, refreshing, using the subnet manager, the connection topology, the connection topology indicative of the current state of the plurality of physical servers and the plurality of switches.

19. A non-transitory machine-readable medium embodying instructions that, when performed by a machine, cause the machine to perform operations comprising:

managing a plurality of virtual servers, the virtual servers provisioned on a plurality of physical servers, each virtual server concurrently executing a different operating system;

monitoring respective events generated by a plurality of switches connected to the plurality of physical servers and related to a link state between the plurality of physical servers and the plurality of switches;

in response to the events:

contacting, over a network, a subnet manager to refresh a connection topology;

determining from the connection topology a particular one of the plurality of switches that generated an event of the events;

determining a communication port on the particular switch that generated the event based upon an identification received as part of the event;

determining a remote communication port of a particular one of the plurality of physical servers from the connection topology, the determined switch, and the communication port of the switch;

retrieving a record of the remote communication port stored in a virtual server database, the virtual server database storing networking configuration information of the virtual servers;

determining that one of the plurality of virtual servers is provisioned on the particular physical server based upon binding information in the record of the remote communication port and information in the virtual server database;

determining that the event indicates that a link between the particular physical server and the particular switch is down;

responsive to determining that the event indicates that the link is down and that one of the plurality of virtual servers is provisioned on the particular physical server, sending a signal to a policy module of a virtual frame director to bypass a normal schedule and prioritize checking the particular physical server and ping the particular physical server to determine if the particular physical server is reachable on a different link between the particular physical server and a different switch of the plurality of switches;

determining that another event of the events indicates that a link between the particular physical server and the particular switch of the plurality of switches is up in response to checking the particular server;

waiting to receive an additional event that indicates that the different link between the particular physical server and the different switch of the plurality switches is up; and in response to receiving the another event and the additional event, refreshing, using the subnet manager, the connection topology, the connection topology indicative of the current state of the plurality of physical servers and the plurality of switches.

* * * * *